US011495854B2

(12) United States Patent
Masumoto et al.

(10) Patent No.: US 11,495,854 B2
(45) Date of Patent: Nov. 8, 2022

(54) BATTERY CELL HAVING WELDED BATTERY CAP

(71) Applicant: Tesla, Inc., Palo Alto, CA (US)

(72) Inventors: Kenjin Masumoto, Nishinomiya Hyogo (JP); Christophe Mille, Redwood City, CA (US)

(73) Assignee: Tesla, Inc., Austin, TX (US)

( * ) Notice: Subject to any disclaimer, the term of this patent is extended or adjusted under 35 U.S.C. 154(b) by 34 days.

(21) Appl. No.: 16/309,523

(22) PCT Filed: Jun. 23, 2017

(86) PCT No.: PCT/US2017/038973
§ 371 (c)(1),
(2) Date: Dec. 13, 2018

(87) PCT Pub. No.: WO2017/223429
PCT Pub. Date: Dec. 28, 2017

(65) Prior Publication Data
US 2019/0267583 A1  Aug. 29, 2019

Related U.S. Application Data

(60) Provisional application No. 62/353,664, filed on Jun. 23, 2016.

(51) Int. Cl.
*H01M 50/147* (2021.01)
*H01M 10/04* (2006.01)
(Continued)

(52) U.S. Cl.
CPC ..... *H01M 50/147* (2021.01); *H01M 10/0431* (2013.01); *H01M 50/155* (2021.01);
(Continued)

(58) Field of Classification Search
CPC .. H01M 2/043; H01M 2/0408; H01M 2/1241; H01M 2/0426; H01M 2/0482;
(Continued)

(56) References Cited

U.S. PATENT DOCUMENTS 6,296,970 B1  10/2001  Killebrew et al.
2005/0147878 A1*  7/2005  Miyahisa ............. H01M 50/116
29/623.4

(Continued)

FOREIGN PATENT DOCUMENTS

CN   105074960   11/2015
EP   2626925 A2   8/2013
(Continued)

OTHER PUBLICATIONS

International Searching Authority; International Search Report and Written Opinion; International Application No. PCT/US2017/038973; dated Sep. 27, 2017; 14 pgs.

(Continued)

*Primary Examiner* — Michael L Dignan
(74) *Attorney, Agent, or Firm* — Knobbe Martens Olson & Bear LLP

(57) ABSTRACT

A battery includes a can, a jelly roll contained in the can, a top insulator contained in the can adjacent to and above the jelly roll, and a battery cap. The battery cap is welded to an inner surface of the can adjacent to and above the top insulator and includes an outer conductive ring, an insulator ring, and a conductive top plate, wherein the outer conductive ring, the insulator ring, and the conductive top plate are crimped together. The battery cap further includes a conductive rupture plate electrically connected to the conductive top plate and a cathode electrically connected to the conductive rupture plate and extending into the jelly roll. The battery may further include an opening in a central (Continued)

portion of the conductive top plate and a central portion of the conductive rupture plate cover welded upon the opening in the central portion of the conductive top plate.

20 Claims, 10 Drawing Sheets

(51) Int. Cl.
| | |
|---|---|
| *H01M 50/155* | (2021.01) |
| *H01M 50/166* | (2021.01) |
| *H01M 50/169* | (2021.01) |
| *H01M 50/578* | (2021.01) |
| *H01M 50/342* | (2021.01) |
| *H01M 50/10* | (2021.01) |
| *H01M 50/56* | (2021.01) |

(52) U.S. Cl.
CPC ....... *H01M 50/166* (2021.01); *H01M 50/169* (2021.01); *H01M 50/3425* (2021.01); *H01M 50/578* (2021.01); *H01M 50/10* (2021.01); *H01M 50/56* (2021.01); *H01M 2220/20* (2013.01)

(58) Field of Classification Search
CPC ............... H01M 2/0486; H01M 2/345; H01M 10/0431; H01M 2/023; H01M 2/0237; H01M 2220/20; H01M 2/0413; H01M 2/0434; H01M 10/0422; H01M 50/152; H01M 50/153; H01M 50/107; H01M 50/109

See application file for complete search history.

(56) References Cited

U.S. PATENT DOCUMENTS

| | | | |
|---|---|---|---|
| 2005/0260489 A1* | 11/2005 | Kim | H01M 50/60 429/163 |
| 2007/0172728 A1 | 7/2007 | Yamashita et al. | |
| 2009/0117459 A1 | 5/2009 | Hyung et al. | |
| 2010/0015508 A1 | 1/2010 | Hwang | |
| 2011/0236733 A1* | 9/2011 | Lee | H01G 11/84 429/94 |
| 2012/0282504 A1* | 11/2012 | Kim | H01M 50/155 429/82 |
| 2013/0216870 A1* | 8/2013 | Kim | H01M 10/0422 429/61 |
| 2014/0087226 A1* | 3/2014 | Mishiro | H01M 50/543 429/94 |
| 2016/0211521 A1* | 7/2016 | Iwayasu | C08F 12/30 |

FOREIGN PATENT DOCUMENTS

| | | |
|---|---|---|
| JP | 2007-194167 | 8/2007 |
| JP | 2012-124009 | 6/2012 |
| JP | 2013-542567 | 11/2013 |
| KR | 2012-124009 | 6/2012 |
| KR | 10-2016-0053743 | 5/2016 |
| WO | WO 16/157749 | 10/2016 |

OTHER PUBLICATIONS

Office Action dated Sep. 1, 2020 of related Japanese application 2018-56704.

* cited by examiner

BATTERY CELL HAVING WELDED BATTERY CAP

CROSS-REFERENCE TO RELATED APPLICATION

The present U.S. Utility Patent Application claims priority pursuant to 35 U.S.C. §371 as U.S. National Phase Application of PCT/US2017/038973, entitled "BATTERY CELL HAVING WELDED BATTERY CAP", filed 23 Jun. 2017, which claims priority pursuant to 35 U.S.C. §119(e) to U.S. Provisional Patent Application No. 62/353,664, entitled "BATTERY CELL HAVING WELDED BATTERY CAP', filed 23 Jun. 2016, both of which are incorporated herein by reference in their entirety for all purposes.

BACKGROUND

Technical Field

The present invention relates to batteries; and more particularly to the structure of single cell batteries that may be used in an array of batteries.

Description of Related Art

Rechargeable electric batteries have been known for some time and are used in a large number of devices including consumer electronics, vehicles, and a great number of other types of devices. In electric vehicles (or hybrid electric vehicles), for example, thousands of relatively small individual batteries are loaded into an array (battery pack) and interconnected to provide electric power to the vehicle. Over time, each of these batteries is partially or fully charged and partially or fully discharged to meet the electrical demands of the electric vehicle. Because of the large number of batteries that are required to power the electric vehicle, the weight and capacity of the individual batteries is very important. Further, the lifetime of the batteries and the complexity of interconnection of the batteries within the array is also very important.

A "jelly roll" or "Swiss roll" design is used in the majority of cylindrical rechargeable batteries, including nickel-cadmium (NiCd), nickel-metal hydride (NiMH) and lithium-ion (Li-ion) batteries. In this design, an insulating sheet is laid down, then a thin layer of an anode material is laid down, a separator layer is applied, and a cathode material is layered on top. This sandwich is then rolled up and inserted into a hollow cylinder casing, often time called a "can". The battery is sealed, metal contacts are attached, and an optional button top is applied if the battery is intended to replace an AAA/AA/C/D alkaline battery. The design gets its name because the cross section of the battery looks like a Swiss roll cake.

Typical battery construction includes a can, the jelly roll contained within the can, a battery cap, which is crimped to a can, and various interconnections and insulators. This structure is fairly simple but has a number of problems. The battery cap is crimped to the can after the jelly roll and a top insulator located above the jelly roll are placed in the can. The top insulator insulates the jelly roll from the conductive battery cap. Crimping the battery cap to the can often damages the jelly roll. Further, because the top insulator, which holds the jelly roll in place, is only held in place by the crimping structure, the top insulator only provides weak physical protection for the jelly roll and must be of a material that is fairly rigid, reducing volume for the jelly roll. Because the jelly roll can expand with operating temperature, this weak physical protection can lead to premature failure of the battery. Other shortcomings of crimped battery cap designs will be described further with reference to FIGS. 2A, 2B, and 3.

SUMMARY

Thus, in order to overcome the above-described shortcomings among other shortcomings, a battery constructed according to a first embodiment of the present disclosure includes a can, a jelly roll contained in the can, a top insulator contained in the can adjacent to and above the jelly roll, and a battery cap welded to an inner surface of the can adjacent to and above the top insulator. The battery cap includes at least an outer conductive ring, an insulator ring, and a conductive top plate. The outer conductive ring, the insulator ring, and the conductive top plate are crimped together. The battery cap further includes a conductive rupture plate electrically connected to the conductive top plate and a cathode electrically connected to the conductive rupture plate that extends into the jelly roll.

With the battery of the first embodiment, multiple benefits exist. Because the conductive top plate is constructed first and later welded to the can, damage caused to the jelly roll during manufacture is minimized. Further, the top insulator may be constructed with less strength, of a cheaper insulator and with a thinner profile, resulting in lesser cost. With the battery cap constructed according to the first embodiment, the battery has a lower profile than prior batteries, allowing more room for the jelly roll, a lower weight of the battery, and a greater battery capacity for a comparable volume and weight.

Various additional structures and elements may be optionally included with the battery of the first embodiment, which may be singularly included, multiply included, or fully included in various aspects of the first embodiment. The battery may include an insulator ring disposed about a periphery of the conductive rupture plate. The battery may further include an expansion volume located between the top insulator and the conductive rupture plate. With some aspects, the outer conductive ring has a flat surface on an upper portion of the outer conductive ring adjacent the can. With this aspect of the battery, the flat surface of the upper portion of the outer conductive ring is an anode. Further, according to this aspect, the conductive top plate is a cathode of the battery.

According to another optional aspect of the first embodiment, the battery includes an opening in a central portion of the conductive top plate and a cover welded upon the opening in the central portion of the conductive top plate. With a variation of this aspect, the battery also includes an opening in a central portion of the conductive rupture plate with the cover including a top portion and a plug portion. With this opening available, the can may be further filled with a fill material via the opening formed in the conductive top plate and the conductive rupture plate with, for example, an electrolyte, which may be a powder or a liquid. Upon installation of the cover, the plug portion extends through both the opening in the central portion of the conductive top plate and the opening in the central portion of the conductive rupture plate and seals the battery.

The conductive rupture plate may be welded to the conductive top plate. Further, a weld between the conductive rupture plate and the conductive top plate enables electrical separation of the conductive rupture plate from the conductive top plate upon an overpressure event of the jelly roll.

According to a second embodiment of the present disclosure, a method for constructing a battery includes forming a can, forming a jelly roll, inserting the jelly roll into the can, inserting a top insulator into the can adjacent to and above the jelly roll and assembling a battery cap that includes an outer conductive ring, an insulator ring, a conductive top plate, a conductive rupture plate. The method further includes connecting a cathode to the conductive rupture plate, inserting the battery cap into the can such that the cathode extends into the jelly roll, and welding the battery cap to an inner surface of the can adjacent to and above the top insulator.

Various additional structures and elements may be optionally included with the method of the second embodiment, which may be singularly included, multiply included, or fully included in various aspects of the first embodiment. Assembling the battery cap may further include crimping together the outer conductive ring, the insulator ring, and the conductive top plate. Assembling the battery cap may further include welding the conductive rupture plate to the conductive top plate. The method may further include installing an insulator about a periphery of the conductive rupture plate. The method may also include forming an expansion volume between the top insulator and the conductive rupture plate.

With the method of the second embodiment, the outer conductive ring may a flat surface on an upper portion of the outer conductive ring adjacent the can that serves as an anode. The method may also include forming an opening in a central portion of the conductive top plate, and, after the battery cap is welded to the can, injecting fill material, e.g., an electrolyte, into the can through the opening, and then welding a cover upon the conductive top plate to close the opening. This aspect may also include forming an opening in a central portion of the conductive rupture plate and inserting a plug portion of the cover through the opening in the central portion of the conductive top plate and through the opening in the central portion of the conductive rupture plate.

Welding the battery cap to the can may be accomplished in differing ways. The battery cap may be welded to the can from above the can, using a welding jig that rotates the battery cap and can about a central axis of the battery and battery cap. The battery cap may alternatively be welded from a side of the can adjacent to the battery cap. In such case, The method of the second embodiment may also include welding the conductive rupture plate to the conductive top plate. A weld between the conductive rupture plate and the conductive top plate enables electrical separation of the conductive rupture plate from the conductive top plate upon an overpressure event of the jelly roll.

Benefits of the disclosed embodiments will become apparent from reading the detailed description below with reference to the drawings.

DETAILED DESCRIPTION OF THE DISCLOSURE

Figure 1:
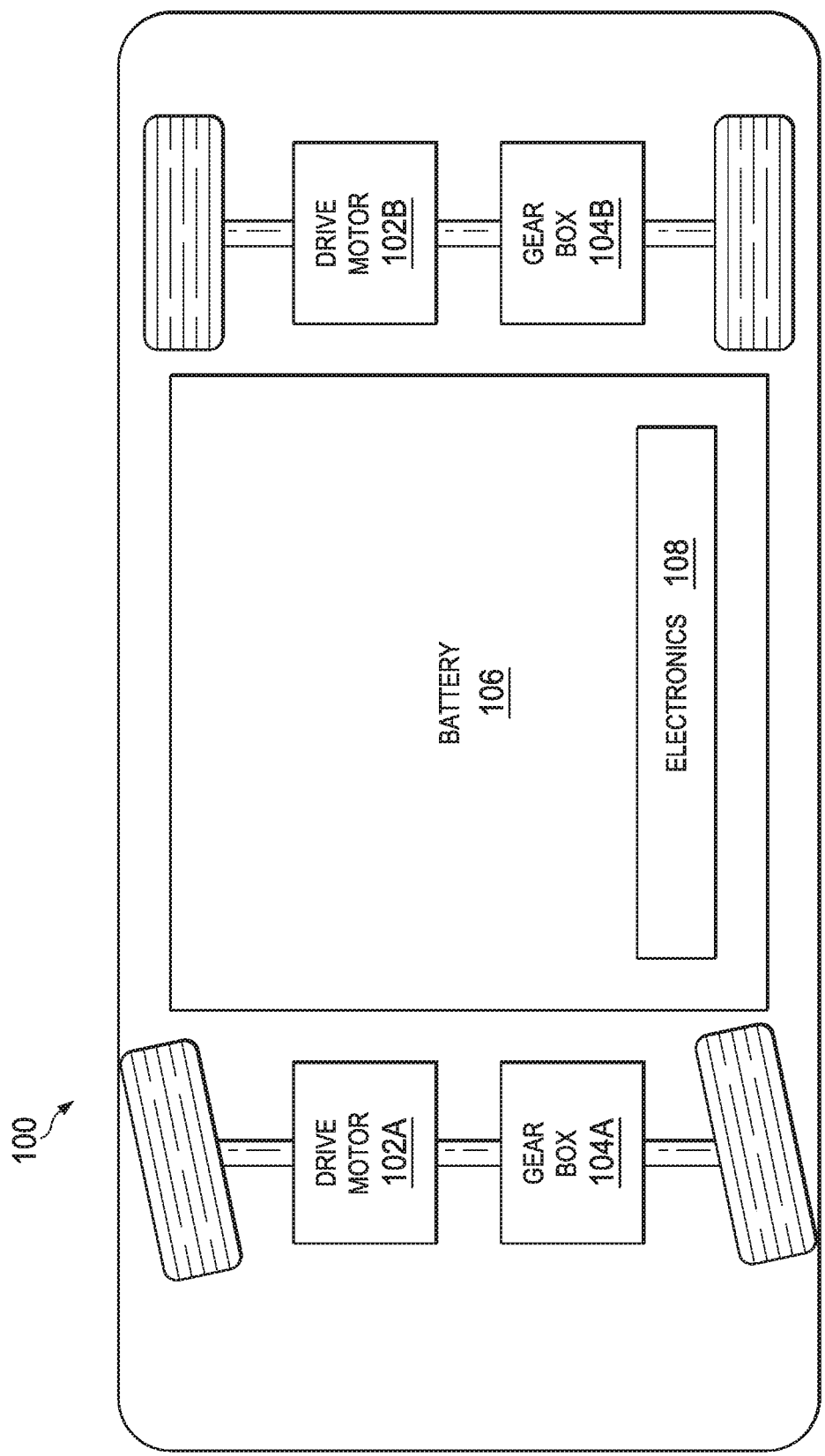
FIG. 1 illustrates the basic components of a battery powered electric vehicle.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, a battery pack 106 and electronics 108 (including drive motor electronics). Generally, the battery pack provides electricity to the electronics 108 of the electric vehicle 100 and to propel the electric vehicle 100 using the drive motor 102A and/or 102B. The battery pack 106 includes an array of individual batteries constructed according to one or more embodiments of the present invention. The battery pack 106, in some embodiments, includes thousands of individual batteries.

The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles.

Because the battery pack 106 is formed of thousands of individual batteries, the weight each battery, when multiplied over thousands of batteries is extremely important. Further, the charge capacity of each battery is also very important when multiple over thousands of batteries. Moreover, the construct of each battery is important due to safety and reliability requirements of the battery pack 106. Subsequent description herein may relate back to the components of this FIG. 1. Common numbering may be used to refer to components identified in further FIGs. described herein.

Figure 2A:
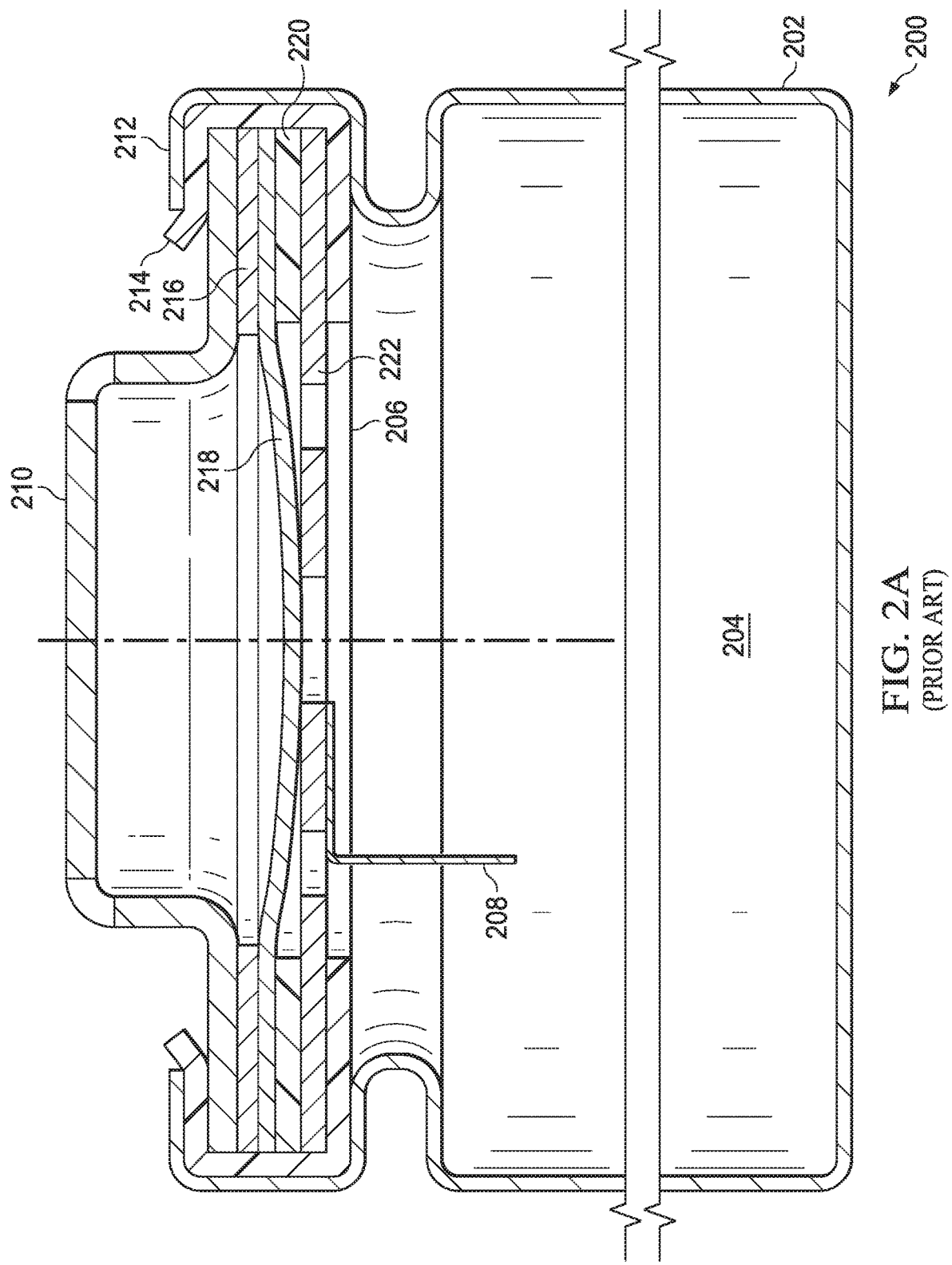
FIGS. 2A and 2B illustrate a prior art battery having a crimped battery cap connection.
Figure 2B:
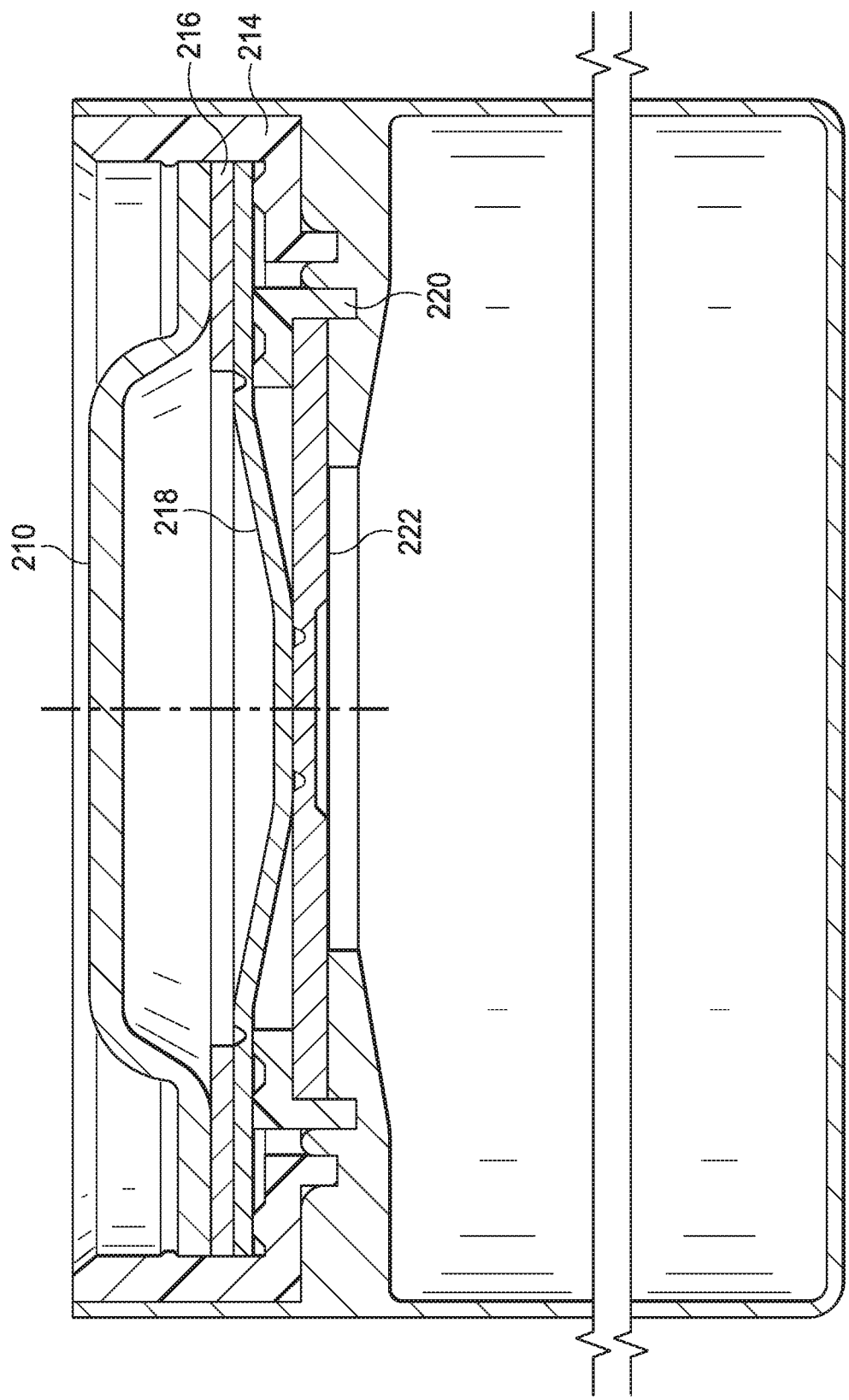

FIGS. 2A and 2B illustrate a prior art battery having a crimped battery cap connection. Referring to FIG. 2A, the battery 200 includes a can 202 in which a "jelly roll" 204 is installed. The "jelly roll" is used in a majority of cylindrical rechargeable batteries, including nickel-cadmium (NiCd), nickel-metal hydride (NiMH) and lithium-ion (Li-ion) batteries. In the jelly roll design, an insulating sheet is laid down, then a thin layer of an anode material is laid down, a separator layer is applied, and a cathode material is layered on top. This sandwich is then rolled into a cylindrical shape and inserted into the can 202. The battery cap is a sandwich structure that includes a conductive top plate 210, an insulator 214 that insulates the conductive top plate 210 from the can 202, a spacer (e.g., Positive Temperature Coefficient "PTC" device) 216, a diaphragm 218, an insulator 220, and a conductive rupture plate 222. The battery cap is crimped to the can 202 with a crimped portion 212. A top insulator 206, in combination with insulator 214, isolates the jelly roll 204 from the battery cap. The conductive rupture plate 222 is welded to the diaphragm 218 and the cathode 208 is welded to the conductive rupture plate 222. In an overpressure event of the jelly roll 204, pressure is exerted by the jelly roll 204 onto the diaphragm 218, causing the weld point between conductive rupture plate 222 and the diaphragm 218 to separate, disconnecting the cathode from the conductive top plate 210, effectively rendering the battery 200 inoperative and precluding further damage to the battery 200 and to a battery pack in which the battery 200 may be included.

With the battery cap being crimped to the can 202, there are difficulties in the manufacturing process. The jelly roll 204 may be damaged when the battery cap is crimped to the can 202. With the structure of the battery 200 of FIG. 2, the jelly roll 204 size is reduced due to the loss of volume within the can 202 due to the height of the crimped connection between the can 202 and the battery top as well as the relative thickness of the battery cap components required to provide structural integrity of the battery 200. Further, top insulator 206 must be of a material of sufficient strength to be held in place by the crimped connection, resulting in increased cost.

Referring now to FIG. 2B, shown in detail are components of the battery cap, including the conductive top plate 210, the insulator 214 that insulates the conductive top plate 210 from the can 202 (crimped portion 212), the spacer (or PTC) 216, the diaphragm 218, the insulator 220, and conductive rupture plate 222. The battery cap is crimped to the can 202 with a crimped portion 212 of the can 202. Top insulator 206, in combination with insulator 214, isolates the jelly roll 204 from the conductive top plate 210. The conductive rupture plate 222 is welded to the diaphragm 218 and the cathode 208 is welded to the conductive rupture plate 222. In an overpressure event of the jelly roll 204, pressure is exerted by the jelly roll 204 onto the diaphragm 218, causing the weld point between conductive rupture plate 222 and the diaphragm 218 to separate, disconnecting the cathode (not shown) from the conductive top plate 210, effectively rendering the battery 200 inoperative and precluding further damage to the battery and to the array in which the battery 200 may be included.

Figure 3:
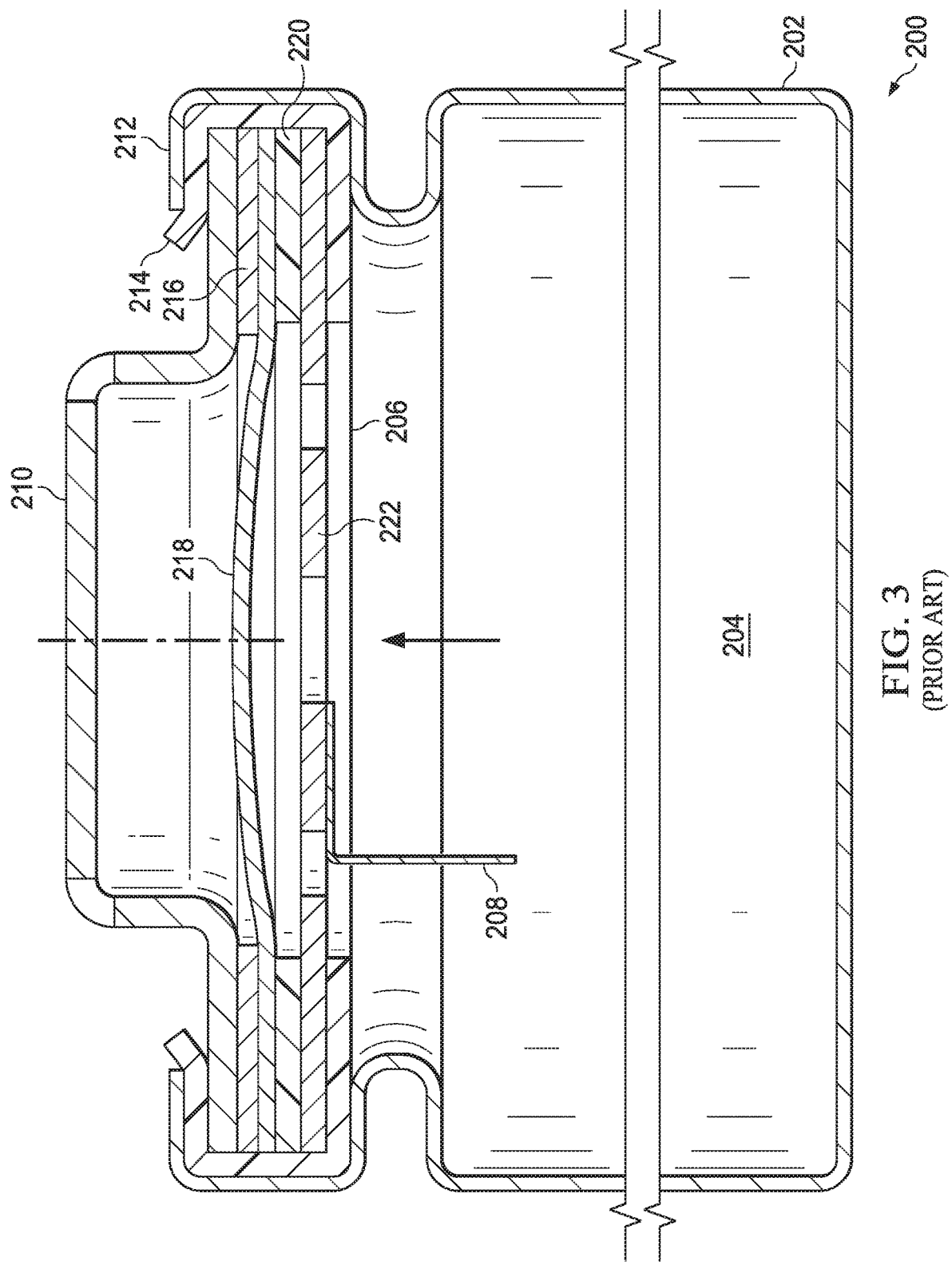
FIG. 3 illustrates the prior art battery of FIGS. 2A and 2B after battery failure.

FIG. 3 illustrates the prior art battery of FIGS. 2A and 2B after battery failure. The battery cap is shown after the diaphragm 218 has separated from the conductive rupture plate 222 after an over pressure condition of the jelly roll 204. With the diaphragm 218 no longer connected to the conductive rupture plate 222 the battery 200 is no longer operational.

Figure 4:
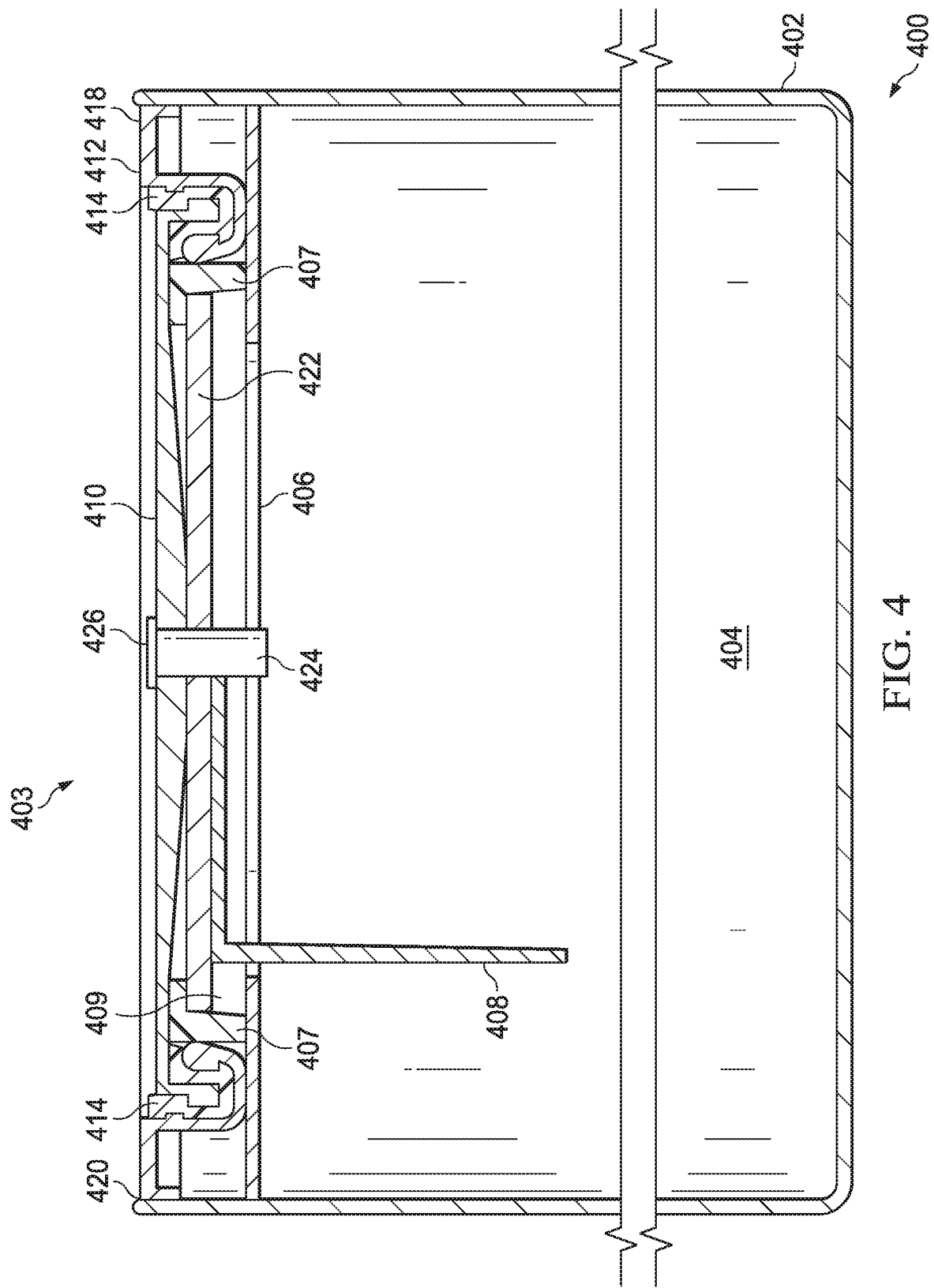
FIG. 4 is a sectional side view of a battery constructed according to a described embodiment.

FIG. 4 is a sectional side view of a battery 400 constructed according to a described embodiment. The battery 400 includes a can 402 in which a "jelly roll" 404 is installed. The "jelly roll" is one of nickel-cadmium (NiCd), nickel-metal hydride (NiMH) or lithium-ion (Li-ion) based structure. The jelly roll 404 is of a cylindrical shape and inserted into the can 402. The battery 400 further includes a top insulator 406 contained in the can 402 adjacent to and above the jelly roll 404. The battery 400 also includes a battery cap 403 that is constructed separately and later welded to an inner surface of the can 402 adjacent to and above the top insulator 406 via weld 420. The battery cap 403 includes an outer conductive ring 412, an insulator ring 414, and a conductive top plate 410. The outer conductive ring 412, the insulator ring 414, and the conductive top plate 410 are crimped together. The insulator ring 414 resides about a periphery of the conductive top plate 410 between the conductive top plate 410 and the outer conductive ring 412. These components are crimped together in a crimping process prior to welding of the battery cap 403 to the can 402. The battery cap 403 further includes a conductive rupture plate 422 electrically connected to the conductive top plate 410 and to a cathode 408 that extends into the jelly roll 404. The battery 400 further includes a conductive rupture plate insulator ring 407 disposed between the crimped combination of the outer conductive ring 412, the insulator ring 414, the conductive top plate 410, and the conductive rupture plate 422.

The battery 400 further includes an expansion volume 409 located between the top insulator 406 and the conductive rupture plate 422. The outer conductive ring 412 comprises a flat surface 418 on an upper portion adjacent the can 402. The battery 400 further includes an opening 424 in a central portion of the conductive top plate 410 and a cover 426 welded upon the opening 424 in the central portion of the conductive top plate 410. The cover 426 may include a top portion and a plug portion as illustrated. The opening 424 remains open after the battery cap 403 is welded to the can 402 and prior to the cover 426 being welded to the conductive top plate 410. Thus, additional filling of the battery 400 with fill material may be done after the top cap is welded to the can 402 and before the cover 426 is welded in place. The fill material may be an electrolyte, which is either a powder or a liquid. The flat surface 418 of the outer conductive ring 412 allows the battery 400 to be coupled into an array of batteries of a battery pack with all connections made to the batteries of the array of batteries on a top side of the array.

The conductive rupture plate 422 is welded to the conductive top plate 410 and the cathode 408 is welded to the conductive rupture plate 422. In an overpressure event of the jelly roll 404, pressure is exerted by the jelly roll 404 onto the conductive rupture plate 422, causing the weld point between the conductive rupture plate 422 and the conductive top plate 410 to separate, disconnecting the cathode 408 from the conductive top plate 410, effectively rendering the battery 400 inoperative and precluding further damage to the battery and to the array in which the battery 400 may be included. Thus, the weld between the conductive rupture plate 422 and the conductive top plate 410 enables electrical separation of the conductive rupture plate from the conductive top plate upon an overpressure event of the jelly roll and has commensurate strength. The structure of the weld between the conductive rupture plate 422 and the conductive top plate 410 is designed to allow separation on an overpressure event but to support integrity at all other times.

Figure 5:
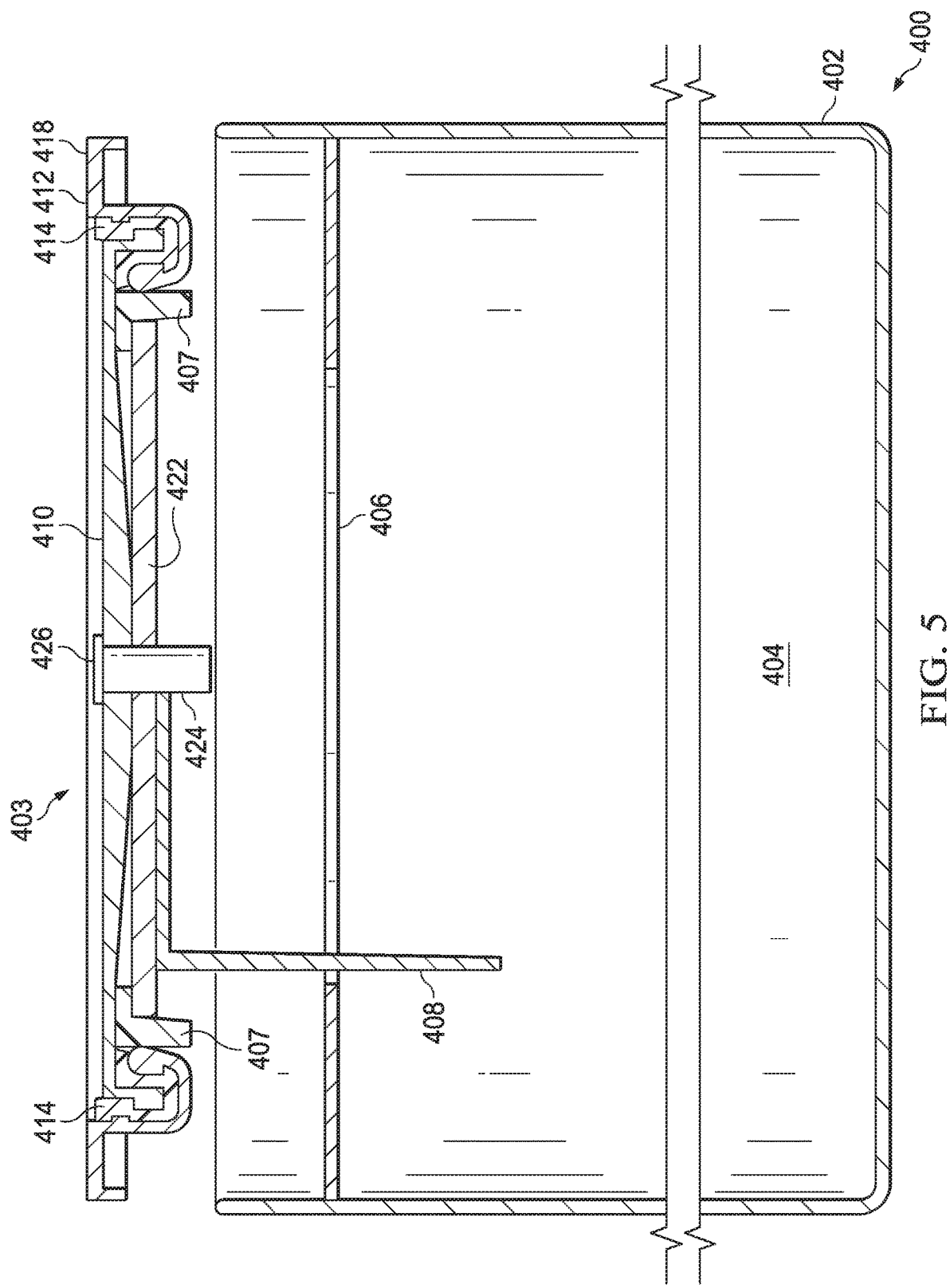
FIG. 5 is a sectional side view of the battery of FIG. 4 prior to attachment of the battery cap to the can.

FIG. 5 is a sectional side view of the battery of FIG. 4 prior to attachment of the battery cap 403 to the can 402. As shown, the battery cap 403 is fully formed prior to its joining the can 402 and its being secured to the can in a welding process. Note that structure of FIG. 5 may differ slightly in some embodiments with the cathode 408 coupling to the conductive rupture plate 422 by spring pressure instead of a weld.

With the battery structure of FIGS. 4 and 5, multiple benefits exist. Because the conductive top plate is constructed first and later welded to the can 402, possible damage caused to the jelly roll 404 during manufacture is minimized. Further, the top insulator 406 may be constructed with less strength, of a cheaper insulator and with a thinner profile, resulting in less cost. With the battery cap 403 constructed as illustrated, the battery cap 403 has a lower profile, allowing more room for the jelly roll 404 and a lower weight of the battery 400. With this battery top cap structure, the cathode 408 is larger than with prior designs and more proximate to a central portion of the battery 400 than with prior structures. Further, by retaining an opening 424 through the battery cap 403 available after the battery cap 403 is welded to the can 402, additional fill material, e.g., electrolyte, may be injected into the battery 400 prior to attachment of the cover 426. Further benefits and advantages over prior structures will be apparent from this and additional description herein.

Figure 6:
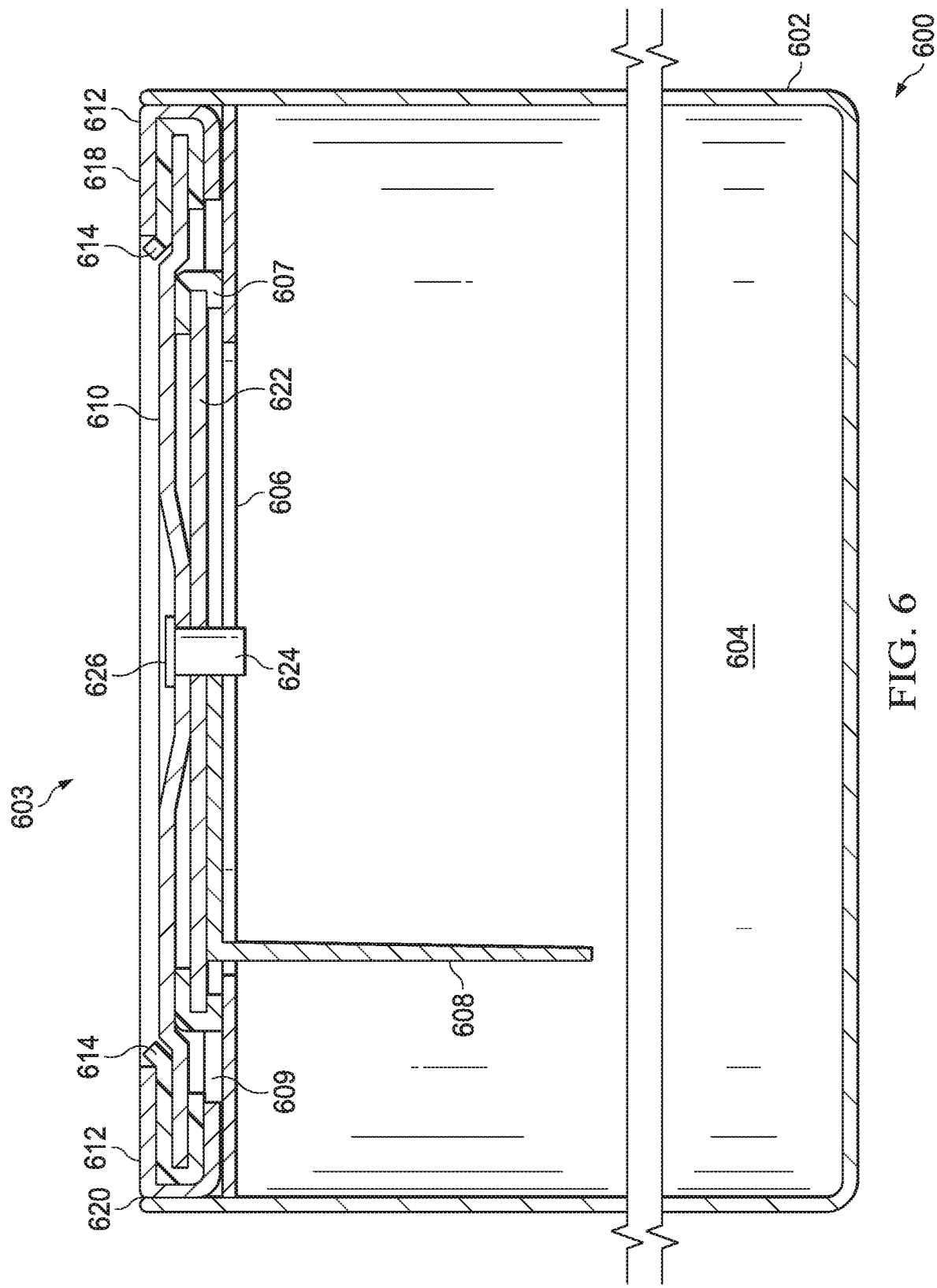
FIG. 6 is a sectional side view of a battery constructed according to another described embodiment.

FIG. 6 is a sectional side view of another battery constructed according to a described embodiment. The battery 600 includes a can 602 in which a "jelly roll" 604 is installed. The "jelly roll" is one of nickel-cadmium (NiCd), nickel-metal hydride (NiMH) or lithium-ion (Li-ion) based structure. The jelly roll 604 is of a cylindrical shape and inserted into the can 602. The battery 600 further includes a top insulator 606 contained in the can 602 adjacent to and above the jelly roll 604. The battery 600 also includes a battery cap 603 that is constructed separately and later welded to an inner surface of the can 602 adjacent to and above the top insulator 606 via weld 620. The battery cap 603 includes an outer conductive ring 612, an insulator ring 614, and a conductive top plate 610. The outer conductive ring 612, the insulator ring 614, and the conductive top plate 610 are crimped together. The insulator ring 614 resides about a periphery of the conductive top plate 610 between the conductive top plate 610 and the outer conductive ring 612. The battery cap 603 further includes a conductive rupture plate 622 electrically connected to the conductive top plate 610 and to a cathode 608 that extends into the jelly roll 604. The battery cap 603 further includes a conductive rupture plate insulator ring 607 disposed between the crimped combination of the outer conductive ring 612, the insulator ring 614, the conductive top plate 610, and the conductive rupture plate 622.

The battery 600 further includes an expansion volume 609 located adjacent and between the top insulator 606, the conductive top plate 610, and the conductive rupture plate 622. The outer conductive ring 612 comprises a flat surface 618 on an upper portion adjacent the can 602. The conductive rupture plate 622 is welded to the conductive top plate 610 and the cathode 608 is welded to (or spring loaded against) the conductive rupture plate 622. In an overpressure event of the jelly roll 604, pressure is exerted by the jelly roll 604 onto the conductive rupture plate 622, causing the weld point between the conductive rupture plate 622 and the conductive top plate 610 to separate, disconnecting the cathode 608 from the conductive top plate 610, effectively rendering the battery 600 inoperative and precluding further damage to the battery and to the array in which the battery 600 may be included.

The battery cap 603 may be formed with an opening 624 formed in the conductive top plate 610 and the conductive rupture plate 622. This opening 624 allows additional fill material to be injected into the battery 600 after the battery cap 603 is welded to the can 602. After the additional fill material is injected via the opening 624, a cover 626 is inserted into the opening 624 and fixed in place via welding or another affixing process. Note that the cover 626 may include a top portion and a plug portion that extends through the conductive top plate 610 and the conductive rupture plate 622. By having this structure, the cover 626 prevents the escape of material even after the separation of the conductive rupture plate 622 from the conductive top plate 610 caused by an over pressure event.

With the battery structure of FIG. 6, multiple benefits exist. Because the conductive top plate is constructed first and later welded to the can 602, damage caused to the jelly roll 604 during manufacture is minimized. Further, the top insulator 606 may be constructed with less strength, of a cheaper insulator and with a thinner profile, resulting in lesser cost. With the battery cap 603 constructed as illustrated, the battery 600 has a lower profile, allowing more room for the jelly roll 604, a lower weight of the battery 600, and a greater battery capacity for a comparable volume and weight. Further benefits and advantages over prior structures will be apparent from this and additional description herein.

The batteries 400 and 600 of FIGS. 4 and 6 include a crimped cap structure that provides additional structural benefits. Referring to FIG. 4, the conductive top plate 410, the outer conductive ring 412, and insulator ring 414 have complementary indentations and extensions that interlock with one another after the sandwiched structure is crimped together. Likewise, referring to FIG. 6, the conductive top plate 610, the outer conductive ring 612, and insulator ring 614 have complementary indentations and extensions that interlock with one another after the sandwiched structure is crimped together. These complementary indentations and extensions are consistent about the circumferences of these components so that the interlocking aspects apply about the circumferences of the parts, adding strength to the crimped structure that was not present in prior art structures.

Figure 7:
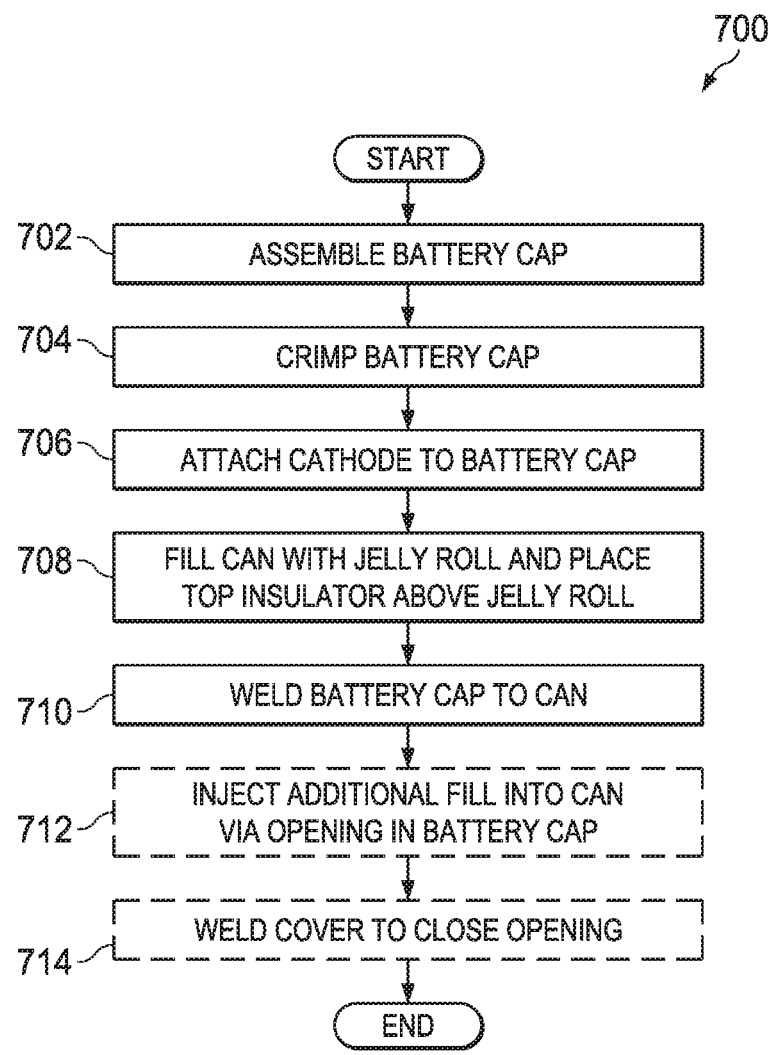
FIG. 7 is a flow chart illustrating a method for constructing a battery according to an embodiment of the present invention.

FIG. 7 is a flow chart illustrating a method for constructing a battery according to an embodiment of the present invention. With the operations 700 of FIG. 7, a can is first formed of a suitable metal. The battery cap is then first assembled (step 702). This assembly is done consistently with the structures illustrated herein in FIGS. 4-6. Once the battery cap is assembled, it is crimped together (step 704). Then, the cathode and conductive rupture plate are attached to the battery cap (step 706). Such attachment takes the form of welding in some embodiments, with the weld between the conductive rupture plate and the conductive top plate enabling electrical separation of the conductive rupture plate from the conductive top plate upon an overpressure event of the jelly roll The can is then filled with the jelly roll and the top insulator is placed above the jelly roll (step 708). Note that step 708 may be performed prior to construction of the battery cap. Further, the order of the steps of the method 700 may be performed in various other steps as well. In another embodiment, the cathode is inserted into the jelly roll, is spring loaded, and makes contact with a conductive portion of the battery cap when the battery cap is inserted into the can. The battery cap is then welded to the can (step 710).

The method 700 may also include forming an opening in a central portion of the conductive top plate and a central portion of the conductive rupture plate. This operation may be performed upon fabrication of each of these components so that the openings are aligned upon assembly of the battery cap components. The method 700 then further includes inserting additional material, e.g., electrolyte, into the can via an injection or other process through the openings (step 712). The method 700 then includes inserting a plug portion of a cover through the opening in the central portion of the conductive top plate and through the opening in the central portion of the conductive rupture plate and then welding the cover to the conductive top plate (step 714). The operations of steps 712 and 714 address an additional problem in some instances. If fill material, e.g., electrolyte, is inserted into the can prior to the welding of the battery cap to the can, the fill material may contaminate the inner surface of the can adjacent the battery cap. In such case, this portion of the inner surface adjacent the battery cap must be cleaned prior to the welding of the battery cap to the can to ensure a clean weld. With the option of steps 712 and 714, the overall cost of manufacture could be greater.

Figure 8:
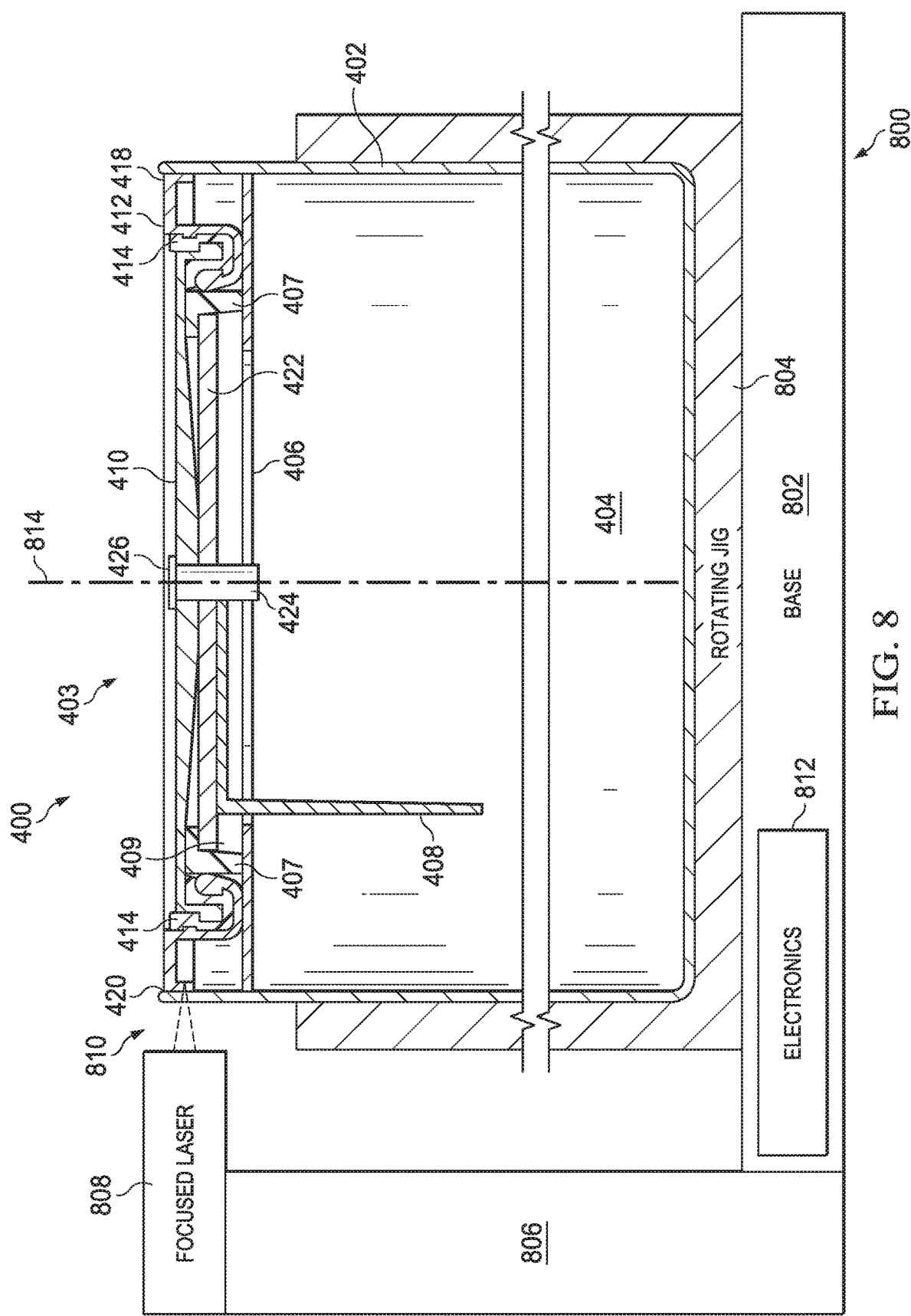
FIG. 8 is a sectional side view of a battery constructed according to the embodiment of FIG. 4 within a welding machine according to another embodiment of the present invention.

FIG. 8 is a sectional side view of a battery constructed according to the embodiment of FIG. 4 within a welding machine according to another embodiment of the present invention. The welding machine 800 includes a base 802 and, rotatingly attached to the base 802, is a rotating jig 804 into which the battery 400 is inserted for welding the can 402 to the battery cap 403. Support structure 806 couples to the base 802 and supports a focused laser 808 that directs a focused laser beam 810 to a depth within the can 402 corresponding to the location where the battery cap 403 contacts the can 402. Electronics 812 control the rotating jig 804 and the focused laser 808 so that the can 402/battery cap 403 rotate about their central axes 814 while the focused laser 808 welds the battery can 402 to the battery cap 403. By welding the can 402 to the battery cap 403 during a full rotation, the battery cap 403 is attached to the can 402 and sealed thereto.

Figure 9:
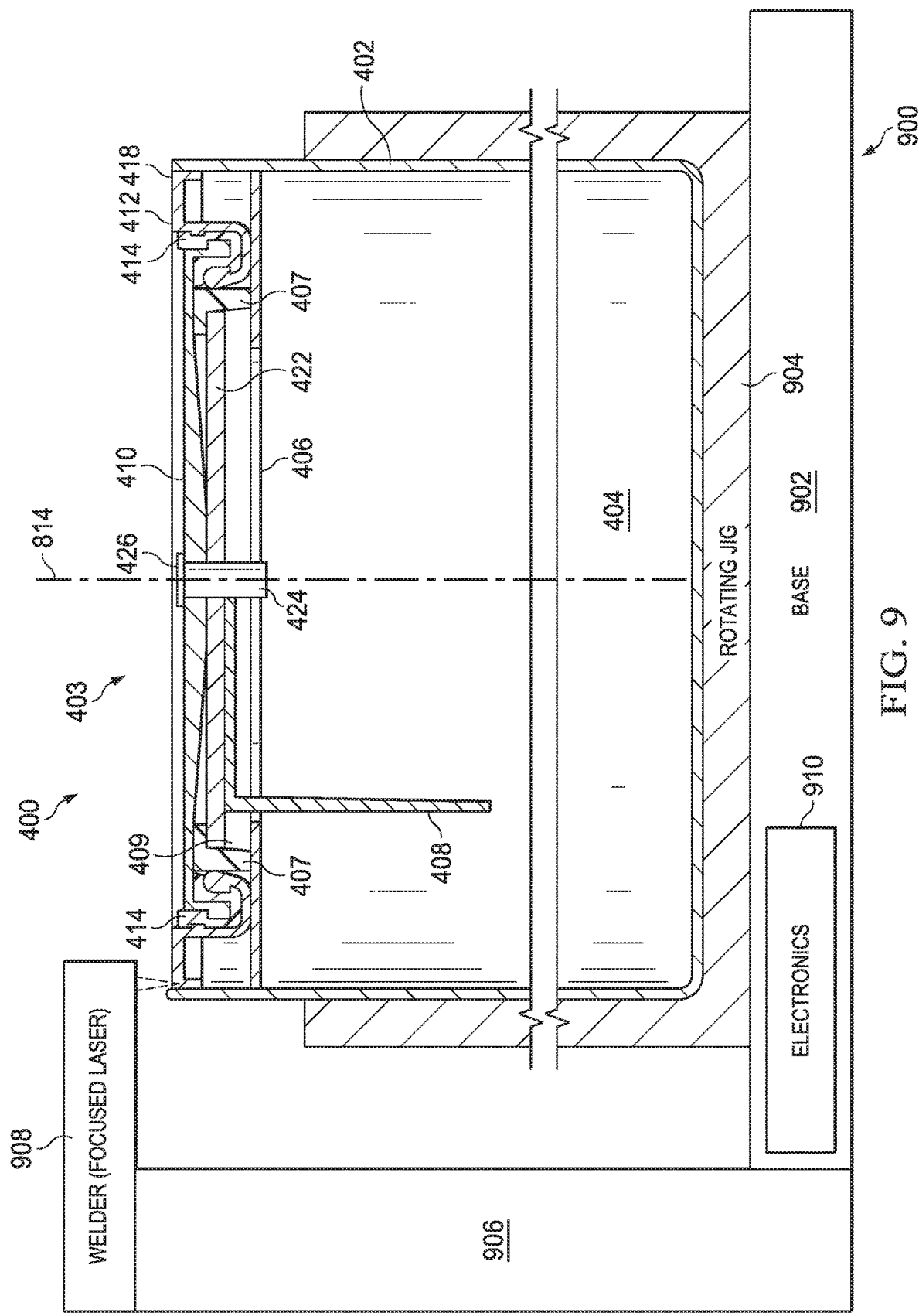
FIG. 9 is a sectional side view of a battery constructed according to the embodiment of FIG. 4 within another welding machine according to another embodiment of the present invention.

FIG. 9 is a sectional side view of a battery constructed according to the embodiment of FIG. 4 within another welding machine according to another embodiment of the present invention. The welding machine 900 includes a base 902 and, rotatingly attached to the base 902, is a rotating jig 904 into which the battery 400 is inserted for welding the can 402 to the battery cap 403. Support structure 906 couples to the base 902 and supports a welder 808 that directs a weld to the location that the can 402 abuts the battery cap 403 contacts the can. In another embodiment, a focused laser is in place of the welder and directs a focused laser beam to the location where the battery cap 403 contacts the can 402. Electronics 912 control the rotating jig 904 and the welder (or focused laser) 908 so that the can 402/battery cap 403 rotate about their central axes 814 while the welder (focused laser) 908 welds the battery can 402 to the battery cap 403. By welding the can 402 to the battery cap 403 during a full rotation, the battery cap 403 is attached to the can 402 and sealed thereto.

The concepts of FIGS. 8 and 9 may be extended to create welding machines that receive more than two batteries at a time for welding. Further, automation may be established to insert a group of batteries into such a welding machine and removing the batteries from the welding machine after welding. These machines may form part of an assembly line employed for the manufacture of batteries according to the present invention.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically not.

The invention claimed is:

1. A battery comprising:
   a can;
   a jelly roll contained in the can;
   a top insulator contained in the can adjacent to and above the jelly roll; and
   a battery cap welded to an inner surface of the can adjacent to and above the top insulator, the battery cap comprising:
     an outer conductive ring;
     an insulator ring;
     a conductive top plate having an opening in a central portion thereof, wherein the outer conductive ring, the insulator ring, and the conductive top plate are crimped together, and wherein the central portion is configured to receive a fill material injected through the opening;
     a conductive rupture plate electrically connected to the conductive top plate; and
     a cathode electrically connected to the conductive rupture plate and extending into the jelly roll.

2. The battery of claim 1 further comprising a second insulator ring disposed about a periphery of the conductive rupture plate.

3. The battery of claim 1, further comprising an expansion volume located between the top insulator and the conductive rupture plate.

4. The battery of claim 1, wherein the outer conductive ring comprises a flat surface on an upper portion of the outer conductive ring adjacent the can.

5. The battery of claim 4, wherein the flat surface of the upper portion of the outer conductive ring comprises an electrical polarity of an anode.

6. The battery of claim 1, wherein the conductive top plate comprises an electrical polarity of a cathode.

7. The battery of claim 1, further comprising:
   a cover welded upon the opening in the central portion of the conductive top plate.

8. The battery of claim 7:
further comprising an opening in a central portion of the conductive rupture plate; and
wherein the cover includes a top portion and a plug portion, the plug portion extending through both the opening in the central portion of the conductive top plate and the opening in the central portion of the conductive rupture plate.

9. The battery of claim 1, wherein the conductive rupture plate is welded to the conductive top plate.

10. The battery of claim 9, wherein a weld between the conductive rupture plate and the conductive top plate enables electrical separation of the conductive rupture plate from the conductive top plate upon an overpressure event of the jelly roll.

11. The battery of claim 1, further comprising an expansion volume located between the top insulator and the conductive rupture plate.

12. The battery of claim 1, wherein the fill material is an electrolyte.

13. A battery comprising:
a can;
a jelly roll contained in the can;
a top insulator contained in the can adjacent to and above the jelly roll; and
a battery cap welded to an inner surface of the can adjacent to and above the top insulator, the battery cap comprising:
an outer conductive ring;
an insulator ring;
a conductive top plate having an opening in a central portion thereof, wherein the outer conductive ring, the insulator ring, and the conductive top plate are crimped together;
a conductive rupture plate having an opening in a central portion thereof, wherein the conductive rupture plate is electrically connected to the conductive top plate;
a cover including a top portion and a plug portion, wherein the plug portion of the cover is configured to receive a fill material injected through the plug portion, and wherein the plug portion extends through both the opening in the central portion of the conductive top plate and the opening in the central portion of the conductive rupture plate; and
a cathode electrically connected to the conductive rupture plate and extending into the jelly roll.

14. The battery of claim 13 further comprising a second insulator ring disposed about a periphery of the conductive rupture plate.

15. The battery of claim 13, wherein the outer conductive ring comprises a flat surface on an upper portion of the outer conductive ring adjacent the can.

16. The battery of claim 15, wherein the flat surface of the upper portion of the outer conductive ring comprises an electrical polarity of an anode.

17. The battery of claim 13, wherein the conductive top plate comprises an electrical polarity of a cathode.

18. The battery of claim 13, wherein the conductive rupture plate is welded to the conductive top plate.

19. The battery of claim 18, wherein a weld between the conductive rupture plate and the conductive top plate enables electrical separation of the conductive rupture plate from the conductive top plate upon an overpressure event of the jelly roll.

20. The battery of claim 13, wherein the fill material is an electrolyte.

* * * * *